(12) United States Patent
Dessau

(10) Patent No.: US 6,984,606 B2
(45) Date of Patent: Jan. 10, 2006

(54) EPOXIDATION CATALYST

(75) Inventor: Ralph M. Dessau, Edison, NJ (US)

(73) Assignee: Lyondell Chemical Technology, L.P., Greenville, DE (US)

(*) Notice: Subject to any disclaimer, the term of this patent is extended or adjusted under 35 U.S.C. 154(b) by 19 days.

(21) Appl. No.: 10/782,172

(22) Filed: Feb. 19, 2004

(65) Prior Publication Data

US 2005/0187394 A1    Aug. 25, 2005

(51) Int. Cl.
*B01J 21/16*    (2006.01)
*C07D 301/06*    (2006.01)
*C07D 301/10*    (2006.01)

(52) U.S. Cl. ...................... 502/242; 549/533
(58) Field of Classification Search ........... 549/533; 502/242
See application file for complete search history.

(56) References Cited

U.S. PATENT DOCUMENTS

| | | | |
|---|---|---|---|
| 3,351,635 A | 11/1967 | Kollar | 260/348.5 |
| 4,367,342 A | 1/1983 | Wulff et al. | 549/529 |
| 4,410,501 A | 10/1983 | Taramasso et al. | 423/326 |
| 4,833,260 A | 5/1989 | Neri et al. | 549/531 |
| 5,859,265 A | 1/1999 | Muller et al. | 549/531 |

FOREIGN PATENT DOCUMENTS

| | | |
|---|---|---|
| JP | 4-352771 | 12/1992 |
| WO | WO 98/00413 | 1/1998 |

OTHER PUBLICATIONS

L. V. Pirutko et al., "Preparation and catalytic study of metal modified TS-1 in the oxidation of benzene to phenol by $N_2O$" Elsevier, *Microporous and Mesoporous Materials*, vol. 48 (2001) 345-353.

*Primary Examiner*—Bernard Dentz
(74) *Attorney, Agent, or Firm*—Kevin M. Carroll

(57) ABSTRACT

Noble metal-containing titanium zeolite catalysts are prepared by reacting a titanium compound, a silicon source, a templating agent, and a noble metal source at a temperature and for a time sufficient to form a molecular sieve. The catalyst is useful in olefin epoxidation with oxygen and hydrogen.

20 Claims, No Drawings

EPOXIDATION CATALYST

FIELD OF THE INVENTION

This invention relates to a one-step process for producing a noble metal-containing titanium zeolite catalyst and its use in olefin epoxidation with oxygen and hydrogen. The process comprises reacting a titanium compound, a silicon source, a templating agent, and a noble metal source at a temperature and for a time sufficient to form a crystalline molecular sieve.

BACKGROUND OF THE INVENTION

Many different methods for the preparation of epoxides have been developed. Generally, epoxides are formed by the reaction of an olefin with an oxidizing agent in the presence of a catalyst. The production of propylene oxide from propylene and an organic hydroperoxide oxidizing agent, such as ethyl benzene hydroperoxide or tert-butyl hydroperoxide, is commercially practiced technology. This process is performed in the presence of a solubilized molybdenum catalyst, see U.S. Pat. No. 3,351,635, or a heterogeneous titania on silica catalyst, see U.S. Pat. No. 4,367,342. Hydrogen peroxide is another oxidizing agent useful for the preparation of epoxides. Olefin epoxidation using hydrogen peroxide and a titanium silicate zeolite is demonstrated in U.S. Pat. No. 4,833,260. One disadvantage of both of these processes is the need to pre-form the oxidizing agent prior to reaction with olefin.

Another commercially practiced technology is the direct epoxidation of ethylene to ethylene oxide by reaction with oxygen over a silver catalyst. Unfortunately, the silver catalyst has not proved useful in commercial epoxidation of higher olefins. Therefore, much current research has focused on the direct epoxidation of higher olefins with oxygen and hydrogen in the presence of a catalyst. In this process, it is believed that oxygen and hydrogen react in situ to form an oxidizing agent. Thus, development of an efficient process (and catalyst) promises less expensive technology compared to the commercial technologies that employ pre-formed oxidizing agents.

Many different catalysts have been proposed for use in the direct epoxidation of higher olefins. Typically, the catalyst comprises a noble metal that is supported on a pre-formed titanosilicate. For example, JP 4-352771 discloses the epoxidation of propylene oxide from the reaction of propylene, oxygen, and hydrogen using a catalyst containing a Group VIII metal such as palladium on a crystalline titanosilicate. U.S. Pat. No. 5,859,265 discloses a catalyst in which a platinum metal, selected from Ru, Rh, Pd, Os, Ir and Pt, is supported on a titanium or vanadium silicalite. Also, PCT Intl. Appl. WO 98/00413 discloses a gold supported on titanosilicates, see for example. These patents all teach the addition of a noble metal to a pre-formed titanosilicate.

As with any chemical process, it is desirable to attain still further improvements in the direct epoxidation methods and catalysts. We have discovered an effective, convenient process to form an epoxidation catalyst in one step and its use in the direct epoxidation of olefins with oxygen and hydrogen.

SUMMARY OF THE INVENTION

The invention is a process for producing a noble metal-containing titanium zeolite and its use in the epoxidation of olefins with hydrogen and oxygen. The process comprises reacting a titanium compound, a silicon source, a templating agent, and a noble metal source at a temperature and for a time sufficient to form a molecular sieve. The catalyst is active in olefin epoxidation with oxygen and hydrogen.

DETAILED DESCRIPTION OF THE INVENTION

The process of the invention is used to produce noble metal-containing titanium zeolites. Titanium zeolites comprise the class of zeolitic substances wherein titanium atoms are substituted for a portion of the silicon atoms in the lattice framework of a molecular sieve. Such substances, and their production, are well known in the art. See for example, U.S. Pat. Nos. 4,410,501 and 4,833,260.

The process of the invention comprises reacting a titanium compound, a silicon source, a templating agent, and a noble metal source at a temperature and for a time sufficient to form a molecular sieve. Although the process of the invention is not limited by choice of a particular titanium compound, suitable titanium compounds useful in the invention include, but are not limited to, titanium alkoxides and titanium halides. Preferred titanium alkoxides are titanium tetraisopropoxide, titanium tetraethoxide and titanium tetrabutoxide. Titanium tetraethoxide is especially preferred. Preferred titanium halides include titanium trichloride and titanium tetrachloride.

Suitable silicon sources include, but are not limited to, colloidal silica, fumed silica and silicon alkoxides. Preferred silicon alkoxides are tetraethylorthosilicate, tetramethylorthosilicate, and the like. Tetraethylorthosilicate is especially preferred.

The templating agent is typically a tetraalkylammonium hydroxide, tetraalkylammonium halide, tetraalkylammonium nitrate, tetraalkylammonium acetate, and the like. Tetraalkylammonium hydroxides and tetraalkylammonium halides, such as tetrapropylammonium hydroxide and tetrapropylammonium halide, are preferred. Tetrapropylammonium hydroxide is especially preferred.

The noble metal source comprises a compound or complex of palladium, platinum, gold, silver, iridium, rhenium, ruthenium, osmium, or mixtures thereof. Palladium, platinum, and gold are particularly desirable. There are no particular restrictions regarding the choice of noble metal compound or complex used as the source of the noble metal. For example, suitable compounds for such purpose include the nitrates, sulfates, halides (e.g., chlorides, bromides), carboxylates (e.g., acetate), and amine complexes of noble metals, as well as compounds containing a mixture of such ligands.

Synthesis of the noble metal-containing titanium zeolites of this invention is carried out by a hydrothermal crystallization of a reaction mixture prepared by combining the titanium compound, silicon source, templating agent, and noble metal source in the presence of water. Other solvents such as alcohols may also be present. Alcohols such as isopropyl, ethyl and methyl alcohol are preferred, and isopropyl alcohol is especially preferred.

Generally, the hydrothermal process used to prepare the noble metal-containing titanium zeolites of this invention involves forming a reaction mixture wherein the molar ratios of additives (as defined in terms of moles of templating agent, moles of noble metal, moles of $SiO_2$ and moles of $TiO_2$) comprise the following molar ratios: $TiO_2$:$SiO_2$=0.5–5:100; templating agent:$SiO_2$=10–50:100; and noble metal:$SiO_2$=0.001–10:100. The water:$SiO_2$ molar ratio is typically from about 1000–5000:100 and the solvent:SiO$_2$ molar ratio may be in the range of 0–500:100.

The reaction mixture is prepared by mixing the desired sources of titanium, silicon, and noble metal to give the reaction mixture. It is also typically necessary that the mixture have a pH of about 9 to about 13. The basicity of the mixture is controlled by the amount of templating agent (if it is in the hydroxide form) which is added and the use of other basic compounds. If another basic compound is used, the basic compound is preferably an organic base that is free of alkali metals, alkaline earth metals, and the like. The addition of other basic compounds may be needed if the templating agent is added as a salt, e.g., halide or nitrate. Examples of these basic compounds include ammonium hydroxide, quaternary ammonium hydroxides and amines. Specific examples include tetraethylammonium hydroxide, tetrabutylammonium hydroxide, n-butylamine, and tripropylamine.

After the reaction mixture is formed, it is reacted at a temperature and a time sufficient to form a molecular sieve. Typically, the reaction mixture is heated at a temperature of about 100° C. to about 250° C. for a period of about 0.5 hours to about 96 hours in a sealed vessel under autogenous pressure. Preferably, the reaction mixture is heated at a temperature range from about 125° C. to about 200° C., most preferably from about 150° C. to about 180° C. After the desired reaction time, the catalyst is recovered. Suitable catalyst recovery methods include filtration and washing (typically with deionized water), rotary evaporation, centrifugation, and the like. The catalyst may be dried at a temperature greater than about 20° C., preferably from about 50° C. to about 200° C.

As synthesized, the noble metal-containing titanium zeolites of this invention will contain some of the templating agent or the additional basic compounds in the pores. In order to decompose the templating agent, the noble metal-containing titanium zeolite is typically calcined at temperatures from about 400° C. to about 800° C., preferably from about 450° C. to about 600° C. The calcination typically is conducted in an oxygen-containing atmosphere, such as air or a mixture of oxygen and an inert gas such as nitrogen. The catalyst may also be pyrolyzed in the presence of an inert gas such as nitrogen prior to calcination in an oxygen-containing atmosphere.

The noble metal-containing titanium zeolite preferably contains a titanium zeolite of the class of molecular sieves commonly referred to as titanium silicalites, particularly "TS-1" (having an MFI topology analogous to that of the ZSM-5 aluminosilicate zeolites), "TS-2" (having an MEL topology analogous to that of the ZSM-11 aluminosilicate zeolites), and "TS-3" (as described in Belgian Pat. No. 1,001,038). Titanium-containing molecular sieves having framework structures isomorphous to zeolite beta, mordenite, ZSM-48, ZSM-12, and MCM-41 may also be formed during the synthesis.

The noble metal-containing titanium zeolite is useful for catalyzing the epoxidation of olefins with oxygen and hydrogen. This epoxidation process comprises contacting an olefin, oxygen, and hydrogen in the presence of the noble metal-containing titanium zeolite. Suitable olefins include any olefin having at least one carbon-carbon double bond, and generally from 2 to 60 carbon atoms. Preferably the olefin is an acyclic alkene of from 2 to 30 carbon atoms; the process of the invention is particularly suitable for epoxidizing $C_2$–$C_6$ olefins. More than one double bond may be present, as in a diene or triene for example. The olefin may be a hydrocarbon (i.e., contain only carbon and hydrogen atoms) or may contain functional groups such as halide, carboxyl, hydroxyl, ether, carbonyl, cyano, or nitro groups, or the like. The process of the invention is especially useful for converting propylene to propylene oxide.

Oxygen and hydrogen are also required for the epoxidation process. Although any sources of oxygen and hydrogen are suitable, molecular oxygen and molecular hydrogen are preferred.

Epoxidation according to the invention is carried out at a temperature effective to achieve the desired olefin epoxidation, preferably at temperatures in the range of 0–250° C., more preferably, 20–100° C. The molar ratio of hydrogen to oxygen can usually be varied in the range of $H_2:O_2=1:10$ to 5:1 and is especially favorable at 1:5 to 2:1. The molar ratio of oxygen to olefin is usually 2:1 to 1:20, and preferably 1:1 to 1:10. A carrier gas may also be used in the epoxidation process. As the carrier gas, any desired inert gas can be used. The molar ratio of olefin to carrier gas is then usually in the range of 100:1 to 1:10 and especially 20:1 to 1:10.

As the inert gas carrier, noble gases such as helium, neon, and argon are suitable in addition to nitrogen and carbon dioxide. Saturated hydrocarbons with 1–8, especially 1–6, and preferably with 1–4 carbon atoms, e.g., methane, ethane, propane, and n-butane, are also suitable. Nitrogen and saturated $C_1$–$C_4$ hydrocarbons are the preferred inert carrier gases. Mixtures of the listed inert carrier gases can also be used.

Specifically in the epoxidation of propylene, propane can be supplied in such a way that, in the presence of an appropriate excess of carrier gas, the explosive limits of mixtures of propylene, propane, hydrogen, and oxygen are safely avoided and thus no explosive mixture can form in the reactor or in the feed and discharge lines.

The amount of noble metal-containing titanium zeolite used may be varied according to many factors, including the amount of noble metal contained in the noble metal-containing titanium zeolite. The total amount of noble metal-containing titanium zeolite may be determined on the basis of the molar ratio of the titanium (contained in the noble metal-containing titanium zeolite) to the olefin that is supplied per unit time. Typically, sufficient catalyst is present to provide a titanium/olefin feed ratio of from 0.0001 to 0.1 hour. The time required for the epoxidation may be determined on the basis of the gas hourly space velocity, i.e., the total volume of olefin, hydrogen, oxygen and carrier gas(es) per unit hour per unit of catalyst volume (abbreviated GHSV). A GHSV in the range of 10 to 100,000 hr$^{-1}$ is typically satisfactory.

Depending on the olefin to be reacted, the epoxidation according to the invention can be carried out in the liquid phase, the gas phase, or in the supercritical phase. When a liquid reaction medium is used, the catalyst is preferably in the form of a suspension or fixed-bed. The process may be performed using a continuous flow, semi-batch or batch mode of operation.

If epoxidation is carried out in the liquid (or supercritical) phase, it is advantageous to work at a pressure of 1–100 bars and in the presence of one or more solvents. Suitable solvents include, but are not limited to, alcohols, water, supercritical $CO_2$, or mixtures thereof. Suitable alcohols include $C_1$–$C_4$ alcohols such as methanol, ethanol, isopropanol, and tert-butanol, or mixtures thereof. Fluorinated alcohols can be used. It is preferable to use mixtures of the cited alcohols with water.

If epoxidation is carried out in the liquid (or supercritical) phase, it is advantageous to use a buffer. The buffer will typically be added to the solvent to form a buffer solution.

The buffer solution is employed in the reaction to inhibit the formation of glycols or glycol ethers during epoxidation. Buffers are well known in the art.

Buffers useful in this invention include any suitable salts of oxyacids, the nature and proportions of which in the mixture, are such that the pH of their solutions may range from 3 to 10, preferably from 4 to 9 and more preferably from 5 to 8. Suitable salts of oxyacids contain an anion and cation. The anion portion of the salt may include anions such as phosphate, carbonate, bicarbonate, carboxylates (e.g., acetate, phthalate, and the like), citrate, borate, hydroxide, silicate, aluminosilicate, or the like. The cation portion of the salt may include cations such as ammonium, alkylammoniums (e.g., tetraalkylammoniums, pyridiniums, and the like), alkali metals, alkaline earth metals, or the like. Cation examples include $NH_4$, $NBu_4$, $NMe_4$, Li, Na, K, Cs, Mg, and Ca cations. More preferred buffers include alkali metal phosphate and ammonium phosphate buffers. Buffers may preferably contain a combination of more than one suitable salt. Typically, the concentration of buffer in the solvent is from about 0.0001 M to about 1 M, preferably from about 0.001 M to about 0.3 M. The buffer useful in this invention may also include the addition of ammonia gas to the reaction system.

The following examples merely illustrate the invention. Those skilled in the art will recognize many variations that are within the spirit of the invention and scope of the claims.

EXAMPLE 1

Preparation of Pd/TS-1 Catalyst

Tetraethylorthosilicate (66.6 g), titanium isopropoxide (3.43 g), tetrapropyl ammonium hydroxide (56 g of 40 wt. % in water), and tetraamine palladium hydroxide (2.0 g of a 3.42 wt. % solution in water) are added to a teflon-lined autoclave. The mixture is heated at 175° C. for 3 days. The solid product is filtered, washed well with water, and then heated in nitrogen at 550° C. for 6 hours, followed by calcinations in air at 350° C. for 4 hours. Catalyst 1 analyzed for 2.6 wt. % Ti and 0.21 wt. % Pd. The X-ray diffraction pattern is consistent with that of TS-1 while the FT-IR scan exhibits a peak at 960 $cm^{-1}$ characteristic of TS-1.

EXAMPLE 2

Epoxidation of Propylene

A 300 cc stainless steel reactor is charged with the catalyst from Example 1 (6 g), methanol (45 g), and a 0.1 M aqueous ammonium phosphate solution at a measured pH of 6.0 (15 g). The reactor is then charged to 300 psig and a gaseous feed consisting of propylene (277 cc/min), hydrogen (46 cc/min), and a 5% oxygen in nitrogen mixture (4318 cc/min) is fed to the reactor. The reactor pressure is maintained at 300 psig via a back pressure regulator. In order to maintain a constant solvent level in the reactor during the run, the gaseous feed is first passed through a two-liter stainless steel vessel (saturator) containing 1.5 liters of methanol prior to the reactor. The reactor is stirred at 1500 rpm and the reaction mixture is heated to 60° C. The gaseous effluent is analyzed by an online GC during a 55-hour run. Propylene oxide is produced during the reaction at a level of approximately 0.1 wt. % in the vapor phase.

I claim:

1. A process for producing a noble metal-containing titanium zeolite, which comprises reacting a titanium compound, a silicon source, a templating agent, and a noble metal source at a temperature and for a time sufficient to form a molecular sieve, wherein the noble metal source comprises one or more noble metals selected from the group consisting of palladium, platinum, and gold.

2. The process of claim 1 wherein the titanium compound is selected from the group consisting of titanium halides, titanium alkoxides, and mixtures thereof.

3. The process of claim 2 wherein the titanium compound is a titanium alkoxide selected from the group consisting of titanium tetraethoxide, titanium tetraisopropoxide, titanium tetrabutoxide, and mixtures thereof.

4. The process of claim 1 wherein the silicon source is selected from the group consisting of colloidal silica, fumed silica, silicon alkoxides, and mixtures thereof.

5. The process of claim 4 wherein the silicon source is a silicon alkoxide selected from the group consisting of tetraethylorthosilicate, tetramethylorthosilicate, and mixtures thereof.

6. The process of claim 1 wherein the templating agent is selected from the group consisting of tetraalkylammonium hydroxide, tetraalkylammonium halides, and mixtures thereof.

7. The process of claim 6 wherein the templating agent is selected from the group consisting of tetrapropylammonium hydroxide, tetrapropylammonium halides, and mixtures thereof.

8. The process of claim 1 wherein the noble metal source comprises palladium.

9. The process of claim 1 wherein the noble metal-containing titanium zeolite comprises a titanium silicalite is selected from the group consisting of TS-1 and TS-2.

10. A epoxidation process comprising reacting an olefin, hydrogen, and oxygen in the presence of a noble metal-containing titanium zeolite, wherein the noble metal-containing titanium zeolite is produced by reacting a titanium compound, a silicon source, a templating agent, and a noble metal source at a temperature and for a time sufficient to form a molecular sieve, and wherein the noble metal source comprises one or more noble metals selected from the group consisting of palladium, platinum, and gold.

11. The process of claim 10 wherein the titanium compound is selected from the group consisting of titanium halides, titanium alkoxides, and mixtures thereof.

12. The process of claim 11 wherein the titanium compound is a titanium alkoxide selected from the group consisting of titanium tetraethoxide, titanium tetraisopropoxide, titanium tetrabutoxide, and mixtures thereof.

13. The process of claim 10 wherein the silicon source is selected from the group consisting of colloidal silica, fumed silica, silicon alkoxides, and mixtures thereof.

14. The process of claim 13 wherein the silicon source is a silicon alkoxide selected from the group consisting of tetraethylorthosilicate, tetramethylorthosilicate, and mixtures thereof.

15. The process of claim 10 wherein the templating agent is selected from the group consisting of tetraalkylammonium hydroxide, tetraalkylammonium halides, and mixtures thereof.

16. The process of claim 15 wherein the templating agent is selected from the group consisting of tetrapropylammonium hydroxide, tetrapropylammonium halides, and mixtures thereof.

17. The process of claim 10 wherein the noble metal source comprises palladium.

18. The process of claim 10 wherein the olefin is a $C_2$–$C_6$ olefin.

19. The process of claim 10 wherein the olefin is propylene and propylene oxide is formed.

20. The process of claim 10 wherein reaction of olefin, hydrogen, and oxygen is performed in a reaction solvent selected from the group consisting of methanol, ethanol, isopropanol, tert-butanol, water, and mixtures thereof.

* * * * *